US012304041B2

(12) United States Patent
Ellis

(10) Patent No.: US 12,304,041 B2
(45) Date of Patent: May 20, 2025

(54) RETAINER INSTALLATION TOOL

(71) Applicant: Toyota Motor Engineering & Manufacturing North America, Inc., Plano, TX (US)

(72) Inventor: David W. Ellis, Evansville, IN (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 366 days.

(21) Appl. No.: 17/730,848

(22) Filed: Apr. 27, 2022

(65) Prior Publication Data

US 2023/0347486 A1 Nov. 2, 2023

(51) Int. Cl.
*B25B 27/14* (2006.01)
*B25B 27/00* (2006.01)

(52) U.S. Cl.
CPC .......... *B25B 27/14* (2013.01); *B25B 27/0035* (2013.01)

(58) Field of Classification Search
CPC ......... B25B 27/02; B25B 27/20; B25B 27/00; B25B 27/12; B25B 27/28; B25B 27/023; B25B 27/10; B25B 27/062; B25B 27/0028; B23Q 1/0081; B23Q 16/00; B23B 31/1071; Y10T 29/53783; Y10T 29/53657; Y10T 29/53678; Y10T 29/53787; Y10T 29/53991
USPC ......... 29/270, 273, 243, 253, 252, 523, 235, 29/229, 243.56; 81/486; 279/2.23, 22, 279/30, 75, 905; 403/322.2
See application file for complete search history.

(56) References Cited

U.S. PATENT DOCUMENTS

| | | | |
|---|---|---|---|
| 3,087,235 | A | 4/1963 | Porter |
| 3,446,101 | A | 5/1969 | McKay |
| 3,965,776 | A | 6/1976 | Wolstenholme et al. |
| 4,265,009 | A | 5/1981 | Mann |
| 4,765,029 | A | 8/1988 | Rogan |
| 7,222,404 | B1 | 5/2007 | Lindsey et al. |
| 7,637,527 | B2 | 12/2009 | Mazanek et al. |

(Continued)

OTHER PUBLICATIONS

U.S. Appl. No. 17/695,306, filed Mar. 15, 2022.
Ellis, Declaration of David W. Ellis, dated May 27, 2023 (19 pages).

*Primary Examiner* — Edward F Landrum
*Assistant Examiner* — Caleb Andrew Holizna
(74) *Attorney, Agent, or Firm* — Christopher G. Darrow; Darrow Mustafa PC

(57) ABSTRACT

A retainer installation tool can facilitate installation of a retainer onto a vehicle body structure. In some arrangements, the retainer can be for a vehicle sonar sensor, and the vehicle body structure can be a bumper. The retainer installation tool can help to ensure proper placement of retainer, sufficient adhesion time, and/or placement of an adhesive. The retainer installation tool can include a plunger that extends partially within a housing. The plunger can have a longitudinal axis. The plunger can be movable along its longitudinal axis within the housing. The retainer installation tool can be configured to retainably engage a retainer. The retainer installation tool can be configured to selectively disengage the retainer when the plunger is depressed downwardly along the longitudinal axis. In such case, the retainer is free to be separated from the retainer installation tool.

15 Claims, 11 Drawing Sheets

(56) References Cited

U.S. PATENT DOCUMENTS

| | | | |
|---|---|---|---|
| 8,474,107 | B2 | 7/2013 | Baumgartner et al. |
| 9,541,194 | B2 * | 1/2017 | Haruna ................. F15B 15/204 |
| 9,833,888 | B2 | 12/2017 | Lambert |
| 10,005,270 | B2 | 6/2018 | Rist et al. |
| 2008/0028577 | A1 | 2/2008 | Soman et al. |
| 2012/0026844 | A1 | 2/2012 | Burkhardt et al. |
| 2016/0059424 | A1 * | 3/2016 | Zachary ............... B25J 15/0416 483/1 |
| 2016/0303720 | A1 | 10/2016 | Lambert |
| 2020/0324377 | A1 * | 10/2020 | Mayes ................. F02M 55/004 |
| 2021/0060746 | A1 | 3/2021 | Marxkors et al. |
| 2022/0341702 | A1 | 10/2022 | Owen et al. |

* cited by examiner

RETAINER INSTALLATION TOOL

FIELD

The subject matter described herein relates in general to retainers and, more particularly, to tools for facilitating the installation of retainer.

BACKGROUND

A vehicle can include one or more sensors for detecting a portion of the external environment of the vehicle. For instance, the vehicle can include a sonar sensor. The sonar sensors can sense objects in the external environment using sound waves. Such a sensor can be used to detect objects in the external environment of the vehicle for safety purposes. The sonar sensor is typically connected to a vehicle body structure, such as a bumper, by a retainer.

SUMMARY

In one respect, the present disclosure is directed to a retainer installation tool. The retainer installation tool can include a plunger that extends partially within a housing. The plunger can have a longitudinal axis. The plunger can be movable along the longitudinal axis within the housing. The retainer installation tool can be configured to retainably engage a retainer. The retainer installation tool can be configured to selectively disengage the retainer when the plunger is depressed downwardly along its longitudinal axis.

In another respect, the present disclosure is directed to a retainer installation tool. The retainer installation tool can include a housing including a plurality of apertures. The housing can include an outer peripheral surface. The retainer installation tool can include a plunger. The plunger can extend partially within the housing. The plunger can be movable within the housing. The retainer installation tool can include a plurality of locking members. When the plunger is in a first position, a portion of each locking member can extend into a respective one of the apertures so as to extend beyond the outer peripheral surface of the housing. Thus, the locking members retainably engage a retainer on the retainer installation tool. When the plunger is in a second position, each locking member can retract toward the plunger such that the locking members do not extend beyond the outer peripheral surface of the lower housing. Thus, the locking members disengage the retainer such that the retainer is free to be separated from the retainer installation tool.

DETAILED DESCRIPTION

Figure 1:
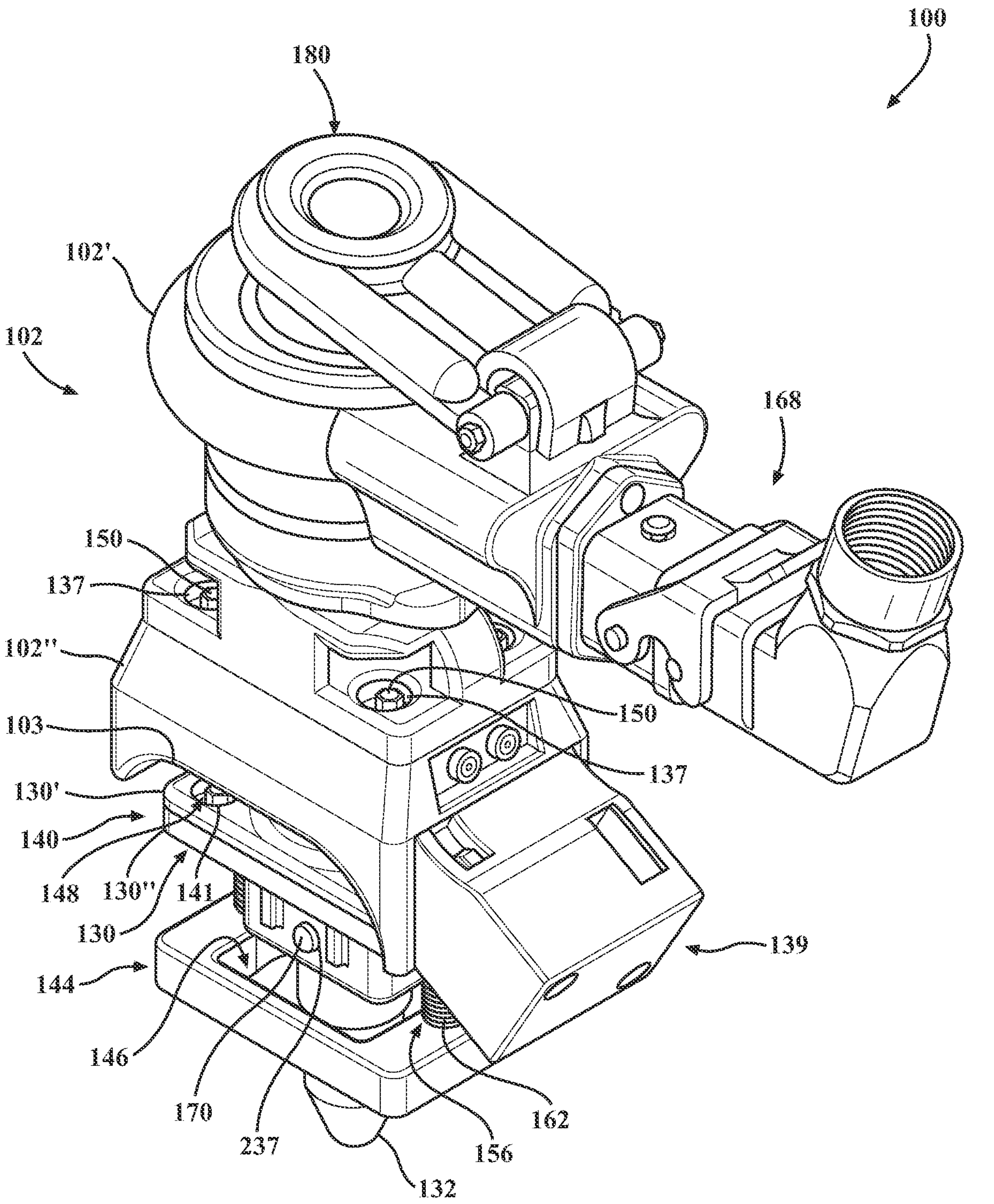
FIG. 1 is an example of a retainer installation tool.

When a sensor retainer is installed into a vehicle body structure, care must be taken to ensure proper placement of retainer, sufficient adhesion time, and/or placement of an adhesive. Failure to do so can result in broken retainers that are unable to hold the sensor or insufficient adhesion resulting in the retainer being prone to separate from the vehicle body structure.

According to arrangements herein, a retainer installation tool can be provided to facilitate installation of a retainer into a vehicle body structure. The retainer installation tool can help to ensure proper placement of retainer, sufficient adhesion time, and/or placement of an adhesive and/or adhesion promoter. The retainer installation tool can include a plunger that extends partially within a housing. The plunger can be movable along its longitudinal axis within the housing. The retainer installation tool can be configured to retainably engage a retainer. The retainer installation tool can be configured to selectively disengage the retainer when the plunger is depressed downwardly along its longitudinal axis. Thus, the retainer is free to be separated from the retainer installation tool.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-13, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Referring to FIGS. 1-5, an example of a retainer installation tool 100 is shown. The retainer installation tool 100 can be configured to facilitate proper installation of a retainer. The retainer can be any type of retainer and for any suitable purpose. In one or more arrangements, the retainer installation tool 100 can be used in connection with a retainer for holding a sonar sensor of a vehicle.

Figure 2:
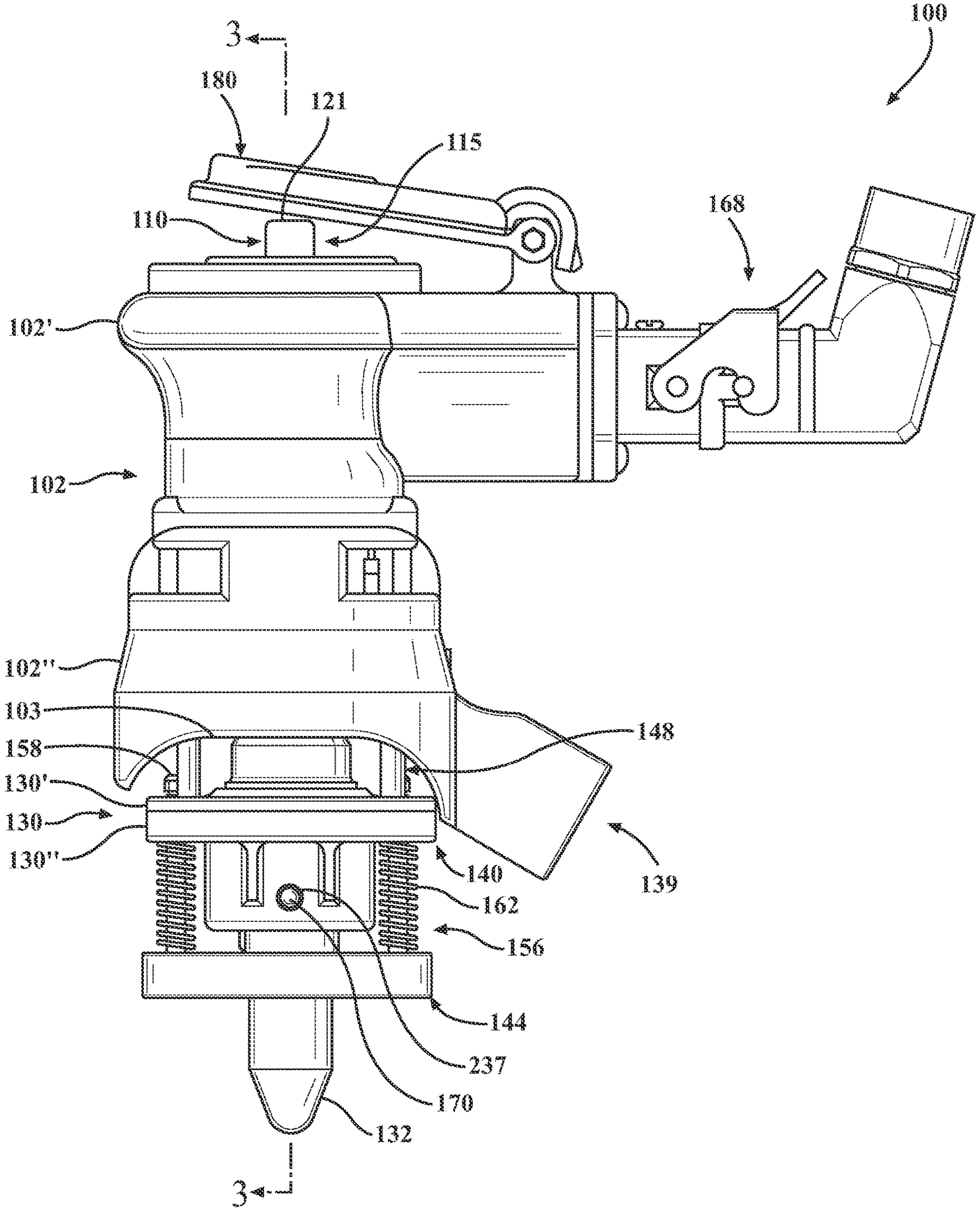
FIG. 2 is a view of the retainer installation tool.

The retainer installation tool 100 can include an outer casing 102. The outer casing 102 can have any suitable size, shape, and/or configuration. In one or more arrangements, at least a portion of the outer casing 102 can be hollow, defining an inner cavity 104. The outer casing 102 can be made of one or more portions. For example, as shown in FIG. 2, the outer casing 102 can include a first casing portion 102' and a second casing portion 102". The outer casing 102 can be made of any suitable material, such as metal or plastic.

The retainer installation tool 100 can include a plunger 110. The plunger 110 can have any suitable size, shape, and/or configuration. In one or more arrangements, the plunger 110 can be substantially cylindrical in conformation. The plunger 110 can be made of any suitable material, such as metal or plastic. The plunger 110 can be partially located within the outer casing 102.

The plunger 110 can have an upper region 120 and a lower region 122. The terms "upper" and "lower" are used for convenience to facilitate the discussion with respect to the orientation of the plunger 110 in FIG. 1. It will be appreciated that, in actual use, the retainer installation tool 100 may be oriented such that the upper region 120 is located below the lower region 122. The plunger 110 can include an upper end 121 and a lower end 123. The plunger 110 can include a pin portion 115 in the upper region 120. The pin portion 115 can define the upper end 121. The pin portion 115 can extend outside of the outer casing 102.

Figure 3:
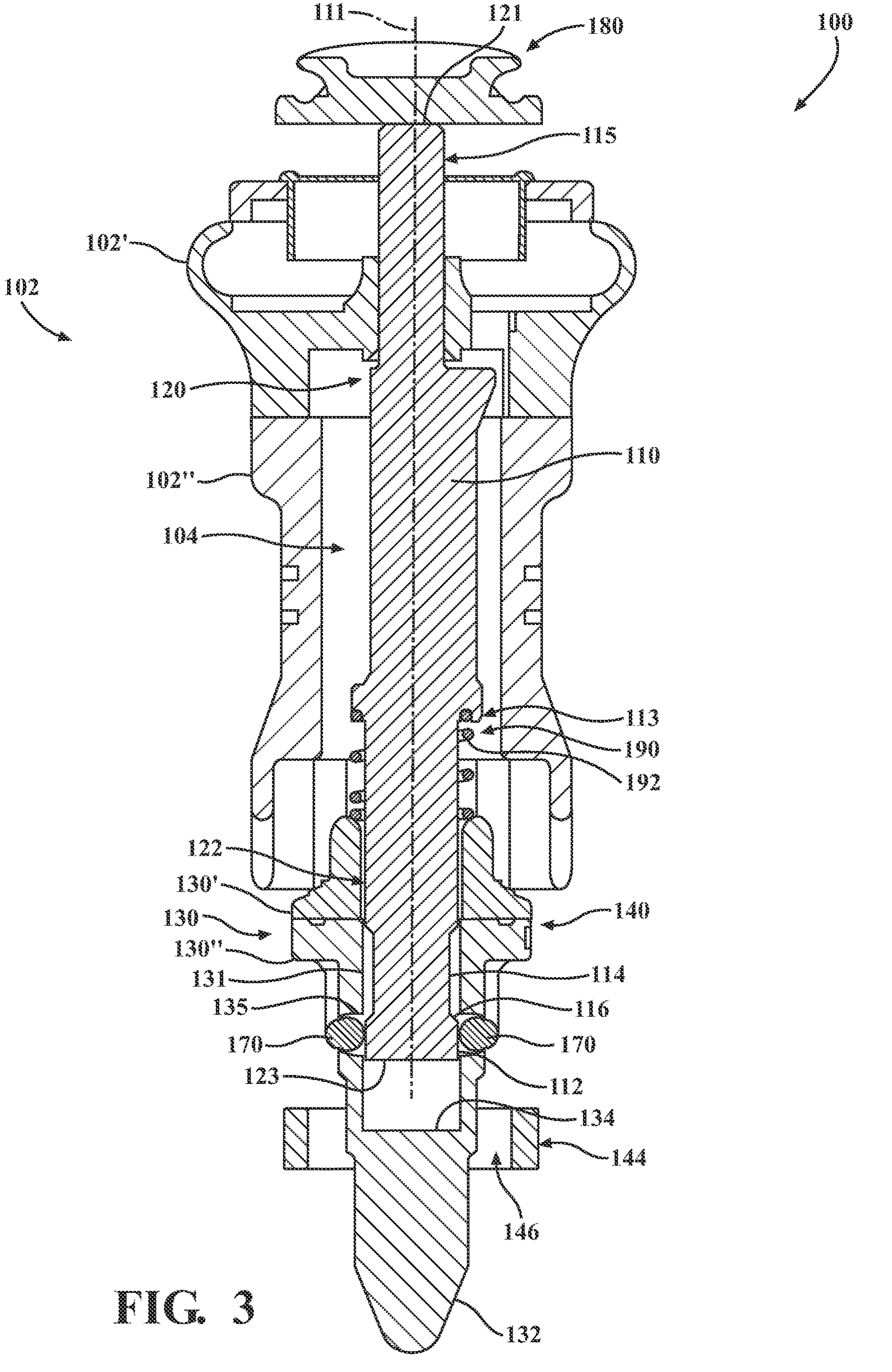
FIG. 3 is a cross-sectional view of the retainer installation tool, showing a plunger in a non-depressed position.
Figure 4:
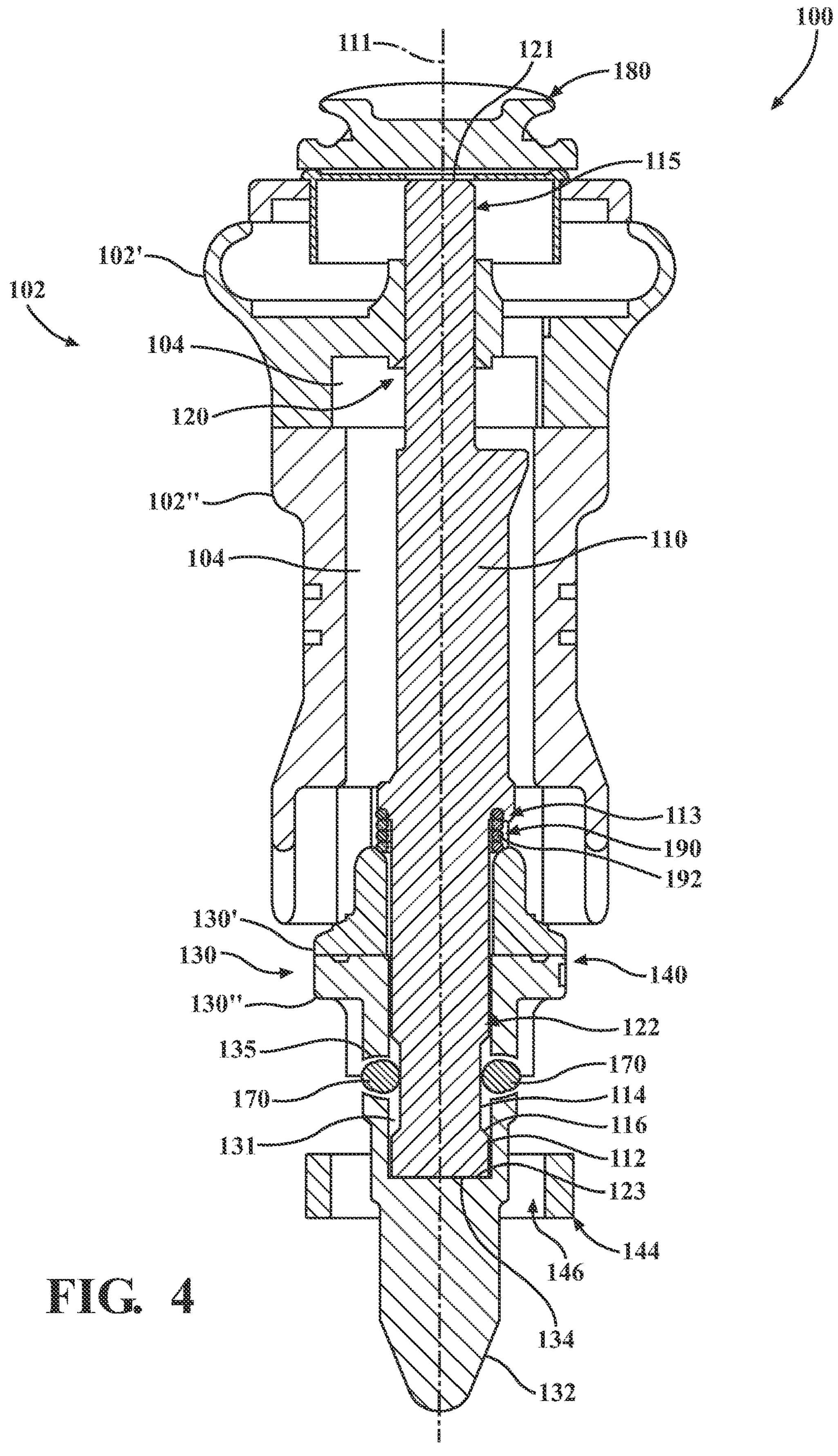
FIG. 4 is a cross-sectional view of the retainer installation tool, showing a plunger in a depressed position.
Figure 5:
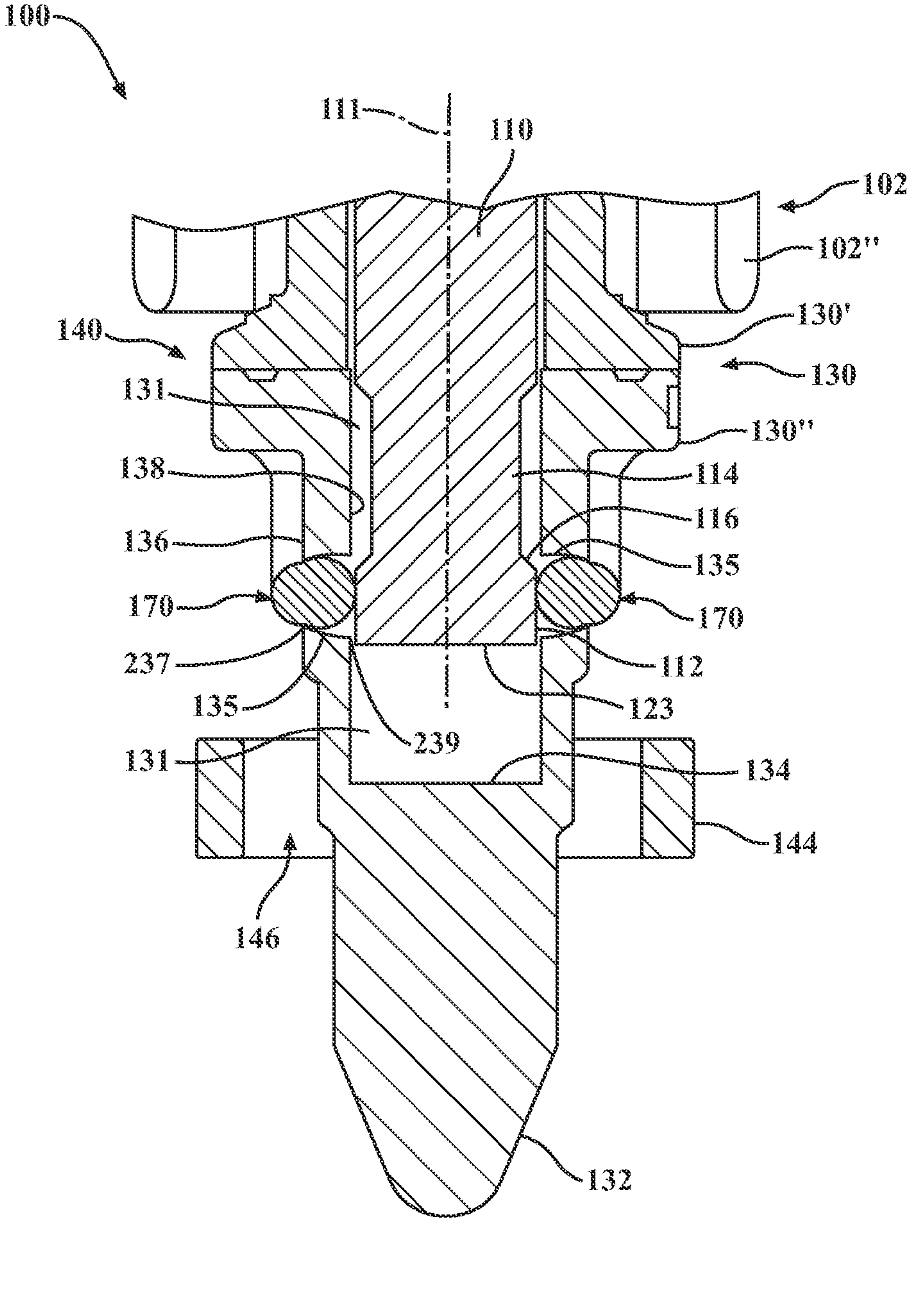
FIG. 5 is a cross-sectional view of a portion of the retainer installation tool, showing locking members in an extended position.
Figure 6:
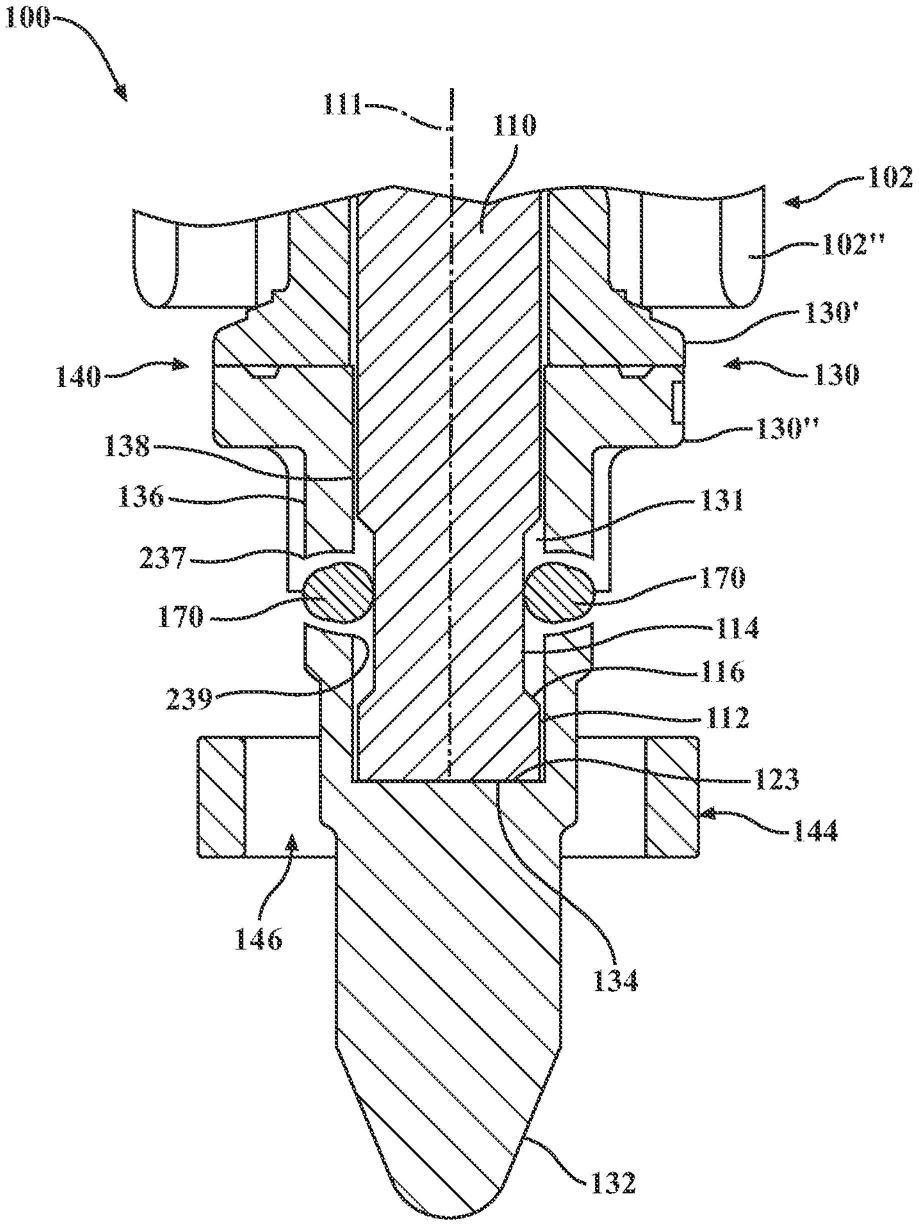
FIG. 6 is a cross-sectional view of a portion of the retainer installation tool, showing locking members in a retracted position.

The plunger 110 can have a longitudinal axis 111 (FIG. 3). The plunger 110 can be movable along the longitudinal axis 111. The plunger 110 can include a non-depressed position, as example of which is shown in FIGS. 3 and 5. The plunger 110 can include a depressed position, as example of which is shown in FIGS. 4 and 6.

In the lower region 122, the plunger 110 can have a first diameter portion 112 and a second diameter portion 114. The first diameter portion 112 can be larger than the second diameter portion 114. The first diameter portion 112 can transition to the second diameter portion 114 in any suitable manner. For instance, the first diameter portion 112 can gradually narrow to the second diameter portion 114, such as by a tapering region 116. As another example, the transition between the first diameter portion 112 and the second diameter portion 114 can be sharp, such as at a substantially 90-degree step.

The retainer installation tool 100 can include a housing 130. The housing 130 can have any suitable size, shape, and/or configuration. In one or more arrangements, at least a portion of the housing 130 can be hollow. The housing 130 can be made of one or more portions. For example, as shown in FIG. 3, the housing 130 can include a first housing portion 130' and a second housing portion 130". The first housing portion 130' and the second housing portion 130" can be operatively connected together in any suitable manner, such as by one or more fasteners, one or more adhesives, one or more welds, one or more forms of mechanical engagement, and/or any combination thereof. The housing 130 can be made of any suitable material, such as metal or plastic.

The plunger 110 can be partially located within the housing 130. The housing can include a central passage 131. The central passage 131 can configured to receive the plunger 110. The plunger 110 can move along the longitudinal axis 111 within the central passage 131 of the housing 130. In some arrangements, the housing 130 can be configured to physically restrict the movement of the plunger 110. For instance, the interior of the housing 130 can include a bottom surface 134. As the plunger 110 is moved downwardly along the longitudinal axis 111, the lower end 123 of the plunger 110 can eventually contact the bottom surface 134 of the central passage 131. As a result, further downward movement of the plunger 110 can be prevented.

The retainer installation tool 100 can include a locating nose 132. The locating nose 132 can be operatively connected to the housing 130. In some arrangements, the locating nose 132 and the housing 130 can be formed together as a unitary structure. The locating nose 132 can have any suitable shape. For instance, the locating nose 132 can be substantially conic, substantially spherically blunted conic, substantially bi-conic, substantially tangent ogive, substantially spherically blunted tangent ogive substantially secant ogive, substantially elliptical, substantially parabolic, substantially cylindrical, just to name a few possibilities. The locating nose 132 can be sized, shaped, and/or configured to pass through a retainer and be received in an aperture in a workpiece on which the retainer will be installed. The locating nose 132 can help to center the retainer installation tool 100 (and the retainer) on the aperture in the workpiece.

The second casing portion 102" can have any suitable size, shape, and/or configuration. In some arrangements, a portion of the second casing portion 102" can have one or more part engaging surfaces 103. The part engaging surface(s) 103 can be contoured to substantially matingly engage a workpiece on which the retainer will be installed and/or other structure near the work piece. For instance, the workpiece can be a vehicle bumper, and the part engaging surface(s) 103 can follow a bumper profile contour.

The second casing portion 102" can include a plurality of apertures 137 (FIG. 1). The apertures 137 can have any suitable size, shape, and/or configuration. In one or more arrangements, the apertures 137 can be substantially circular in cross-sectional shape. As will be explained herein, the apertures 137 can receive a fastener and allow movement of the fastener therein. The second casing portion 102" can include a side enclosure portion 139. The side enclosure portion 139 can at least partially house one or more components of the retainer installation tool 100, such as light source(s) 1140 and light detector(s) 1145.

The retainer installation tool 100 can include a platform 140. The platform 140 can have any suitable size, shape, and/or configuration. The platform 140 can be made of any suitable material. In one or more arrangements, the platform 140 can be defined by the housing 130.

Figure 9:
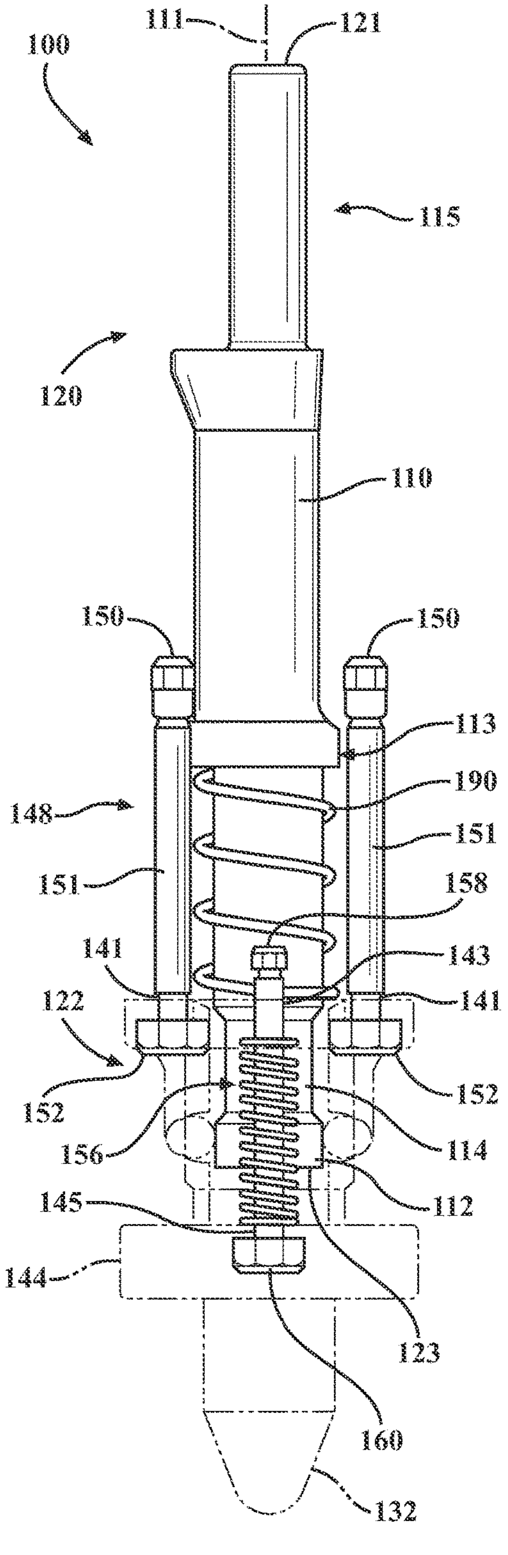
FIG. 9 is a view of the retainer installation tool with one or more components removed.
Figure 10:
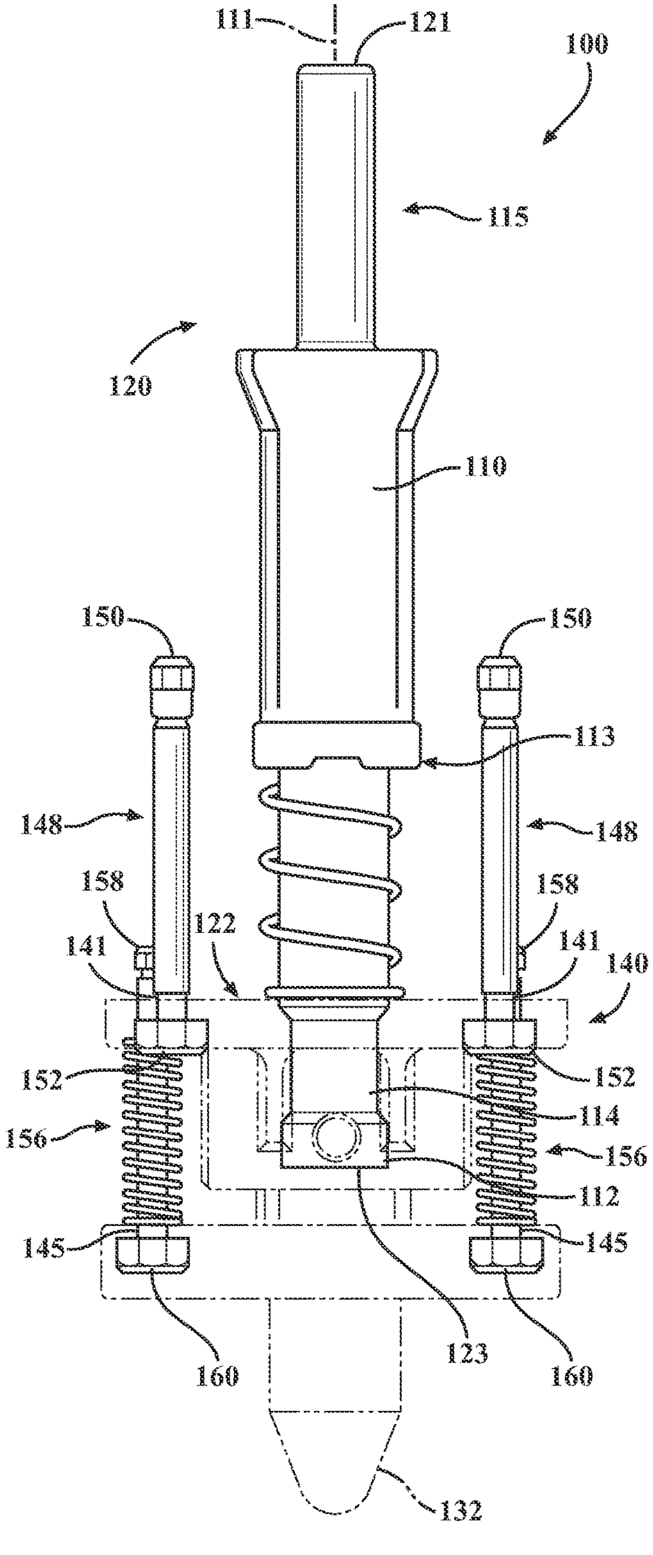
FIG. 10 is another view of the retainer installation tool with one or more components removed.

The platform 140 can include a plurality of apertures, including aperture(s) 141 and aperture(s) 143, as shown in FIGS. 9 and 10. The apertures 141, 143 can have any suitable size, shape, and/or configuration. In one or more arrangements, the apertures 141, 143 can be substantially circular in cross-sectional shape. As will be explained herein, the apertures 141, 143 can receive a fastener and allow movement of the fastener therein. In one or more arrangements, the apertures 143 in the platform 140 can be substantially aligned with the apertures 137 in the second casing portion 102", and the apertures 141 in the platform 140 can be offset from the apertures 137 in the second casing portion 102".

The retainer installation tool can include a push ring 144. The push ring 144 can be configured to form a closed shape or a substantially closed shape. The push ring 144 can have any suitable size, shape, and/or configuration. In one or more arrangements, the push ring 144 can be substantially rectangular or substantially polygonal in shape. The push ring 144 can be custom configured to fit into the tight geometry of a retainer.

The push ring 144 can be made of any suitable material. In one or more arrangements, the push ring 144 can include a central aperture 146. The housing 130 and/or the locating nose 132 can pass through the central aperture 146 of the push ring 144. The central aperture 146 can be sized, shaped, and/or configured to receive a retainer. The push ring 144 can include a plurality of apertures 145. A fastener can be received in the each of the apertures 145.

The retainer installation tool 100 can include a first plurality of fasteners 148. The first plurality of fasteners 148 can extend between the outer casing 102 and the platform 140. The first plurality of fasteners 148 can extend substantially parallel to the longitudinal axis 111.

The first plurality of fasteners 148 can include a first end 150 (FIG. 4) and a second end 152 (FIG. 1). The first end 150 of the first plurality of fasteners 148 can be fixed to the platform 140, such as by one or more fasteners, one or more forms of mechanical engagement, one or more welds, one or more brazes, one or more forms of adhesives, or any combination thereof, just to name a few possibilities. A portion of the first plurality of fasteners 148 can be received in the apertures 143 in the platform 140. The first plurality of fasteners 148 can be substantially fixed within the apertures 143, such as by one or more fasteners (e.g., screws 151 in FIG. 4). The first plurality of fasteners 148 can also be received in respective apertures 137 in the second casing portion 102". The first plurality of fasteners 148 can be free to move axially within the apertures 137. As a result of these arrangements, relative movement between the outer casing 102 and the platform 140 can be permitted. The second end 152 of the first plurality of fasteners 148 may not be fixed to another structure and, thus, can be free to move.

The first plurality of fasteners 148 can be any type of fastener. In one or more arrangements, the first plurality of fasteners 148 can be pins, rods, bolts, screws, or other type of fastener. The first plurality of fasteners 148 can be substantially identical to each other, or one or more of the first plurality of fasteners 148 can be different from the other fasteners in one or more respects.

The first plurality of fasteners 148 can include any quantity of fasteners. While FIG. 4, shows the first plurality of fasteners 148 as having four fasteners, it will be appreciated that there can be more fasteners or fewer fasteners. In some arrangements, the first plurality of fasteners 148 may not have biasing members associated with them. However, in other arrangements, the first plurality of fasteners 148 can include one or more biasing members for biasing the outer casing 102 and/or the platform 140 to a non-compressed position.

The retainer installation tool 100 can include a second plurality of fasteners 156. The second plurality of fasteners 156 can extend between the platform 140 and the push ring 144. The second plurality of fasteners 156 can extend substantially parallel to the longitudinal axis 111.

The second plurality of fasteners 156 can include a first end 158 and a second end 160, as shown in FIG. 4. The first end 158 of the second plurality of fasteners 156 can be fixed to the push ring 144, such as by one or more fasteners, one or more forms of mechanical engagement, one or more welds, one or more brazes, one or more forms of adhesives, or any combination thereof, just to name a few possibilities. A portion of the second plurality of fasteners 156 can be received in the apertures 145 in the push ring 144.

The second plurality of fasteners 156 can be substantially fixed within the apertures 145 (FIG. 4). The second plurality of fasteners 156 can also be received in respective apertures 141 in the platform 140. The second plurality of fasteners 156 can be free to move axially within the apertures 141. As a result of these arrangements, relative movement between the push ring 144 and the platform 140 can be permitted. The second end 160 of the second plurality of fasteners 156 may not be fixed to another structure and, thus, can be free to move.

The second plurality of fasteners 156 can be any type of fastener. In one or more arrangements, the second plurality of fasteners 156 can be pins, rods, bolts, screws, or other type of fastener. The second plurality of fasteners 156 can be substantially identical to each other, or one or more of the second plurality of fasteners 156 can be different from the other fasteners in one or more respects.

The second plurality of fasteners 156 can include any quantity of fasteners. While FIG. 4 shows the second plurality of fasteners 156 as having two fasteners, it will be appreciated that there can be more fasteners. Further, the second plurality of fasteners 156 can include one or more biasing members, such as springs 162, for biasing the platform 140 and the push ring 144 to a non-compressed position. Each of the second plurality of fasteners 156 can pass through a respective one of the springs 162.

The retainer installation tool 100 can be configured to selectively retainably engage a retainer. The retainer installation tool 100 can be configured to selectively disengage the retainer, such as by rotating the plunger 110, as will be explained further herein.

It will be appreciated that the retainer installation tool 100 can be used to install different types of retainers into different types of parts. To that end, the retainer installation tool 100 can be configured to allow different application heads can be used depending on the type of retainer being installed and/or the part into which the retainer is being installed and/or other nearby structures. The application heads of the retainer installation tool 100 can include the outer casing 102, the housing 130, the platform 140, the push ring 144, and/or other components of the retainer installation tool 100.

As will be further explained herein, the retainer installation tool 100 can include one or more light sources 1140 and one or more light detectors 1145. In some arrangements, the light source(s) 1140 and the light detector(s) 1145 can be located within a portion of the outer casing 102, such as in the side enclosure portion 139. Further, the retainer installation tool 100 can include one or more timers 1170 (see FIG. 11). The one or more timers 1170 can be used for various purposes. For instance, the timer(s) 1170 can be used to count from an event. For example, the event can be when the retainer installation tool 100 presses a retainer into or onto a receiving part with sufficient pressure or force. The timer(s) 1170 can begin counting to ensure a sufficient curing time or setting time of any adhesives used in the installation process.

The retainer installation tool 100 can be configured to facilitate a user's movement of the plunger 110. To that end, the retainer installation tool 100 can include one or more features to enable a user to move the plunger 110 along the longitudinal axis 111. As an example, the retainer installation tool 100 can include a release member 180. The release member 180 can be configured to be engaged by a user's hand, such as a palm of a user's hand. The release member 180 can be operatively connected to the outer casing 102. In one or more arrangements, the release member 180 can be pivotably connected to the outer casing 102. The release member 180 can be made of a soft material for comfortable engagement by a user. In some arrangements, the release member 180 can include one or more ergonomic features and/or configurations.

The release member 180 can be operatively positioned to engage the upper region 120 and/or the upper end 121 of the plunger 110. The release member 180 can be positioned to cause the plunger 110 to be depressed along the longitudinal axis 111. When a user pushes down on the release member 180, the release member 180 can engage the upper end 121 of the plunger 110. As a result, the plunger 110 can move downwardly along the longitudinal axis 111.

The plunger 110 can be biased into a non-depressed position. To that end, one or more spring members 190 can be operatively positioned relative to the plunger 110. In one or more arrangements, the one or more spring members 190 can include a coil spring 192. The plunger 110 can pass through the coil spring 192. The coil spring 192 can be operatively positioned between a shoulder 113 of the plunger 110 and the housing 130 (e.g., the first housing portion 130'). Thus, when a user lets go of the release member 180, the coil spring 192 can bias the plunger 110 back into a non-depressed position.

The retainer installation tool 100 can include an electrical quick connect/disconnect 168. The electrical quick connect/disconnect 168 can be any type of electrical quick connect/disconnect, now known or later developed. In some arrangements, the electrical quick connect/disconnect 168 can include latching power connectors. Thus, the retainer installation tool 100 can be readily connected and/or disconnected to a power source.

The retainer installation tool 100 can be configured to retainably engage a retainer on the retainer installation tool 100 and to selectively disengage the retainer to allow the retainer to be separated from the retainer installation tool 100. To that end, the retainer installation tool 100 can include one or more locking members 170. In some arrangements, the retainer installation tool 100 can include a plurality of locking members 170. The locking members 170 can be configured to retainably engage a retainer on the retainer installation tool 100.

Figure 7:
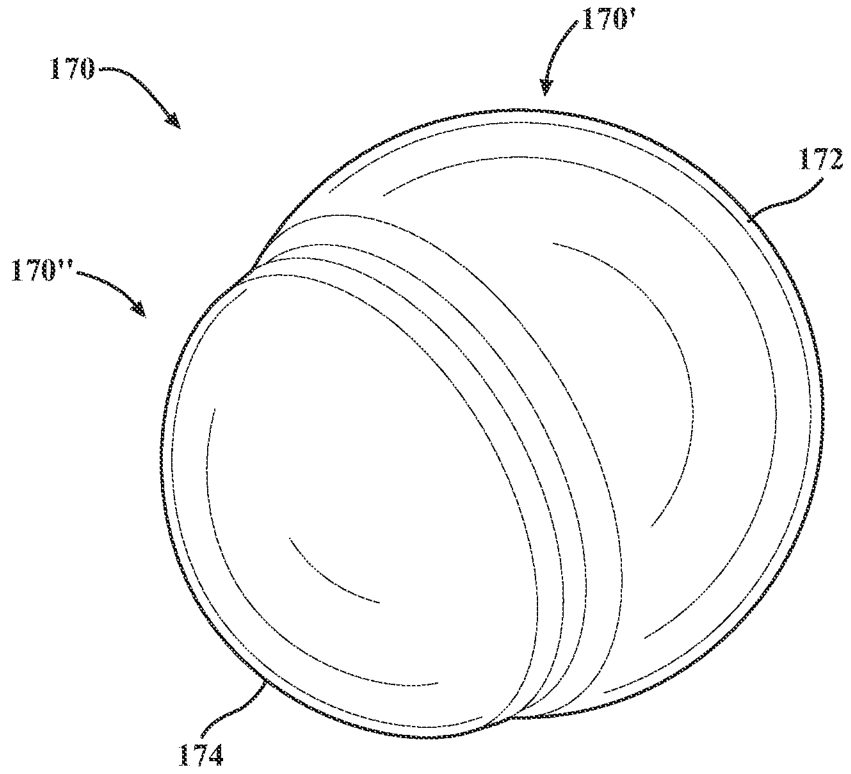
FIG. 7 is a view of an example of a locking member.
Figure 8:
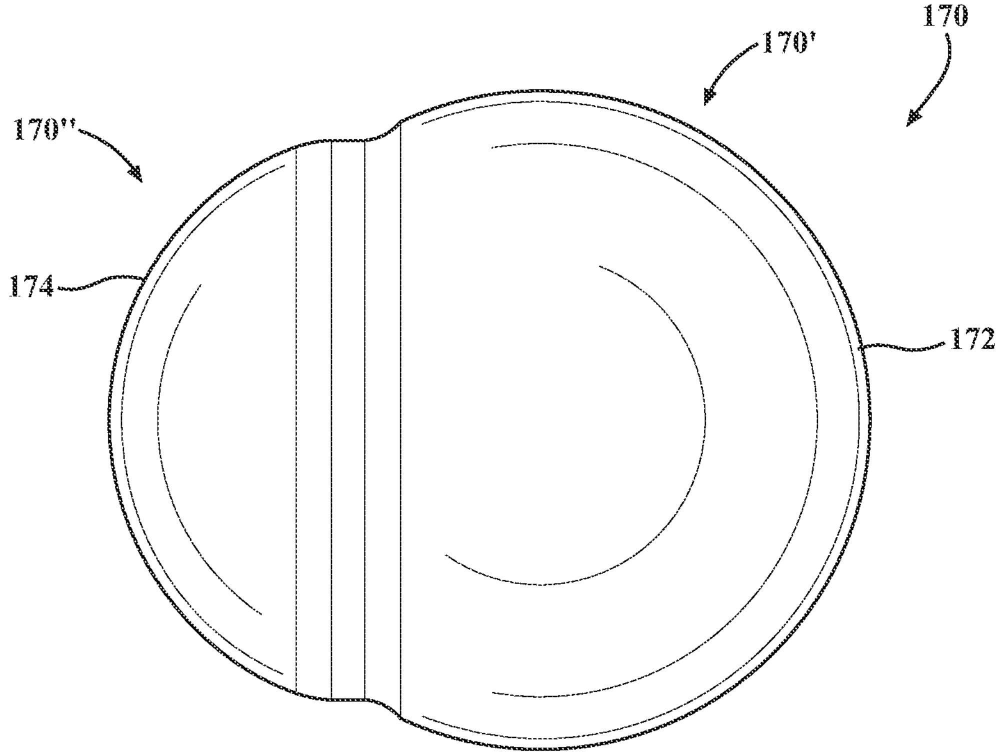
FIG. 8 is a view of the locking member.

FIGS. 7-8 show one example of a locking member 170. The locking member 170 can have any suitable size, shape, and/or configuration. In some arrangements, the locking member 170 can have a first portion 170' and a second portion 170". The first portion 170' can be larger than the second portion 170".

In one or more arrangements, the locking member 170 can include a double substantially semi-spherical shape including a first substantially semi-spherical portion 172 and a second substantially semi-spherical portion 174. The first substantially semi-spherical portion 172 can be larger than the second substantially semi-spherical portion 174. It will be appreciated that a double substantially semi-spherical shape is merely one example of a shape for the locking member 170.

The locking members 170 can be made out of any suitable material, such as metal, alloys, plastics, or polymers, just to name a few possibilities. The locking member 170 can be formed in any suitable manner. For instance, the locking members 170 can be formed by machining, casting, welding, and/or injection molding.

In some arrangements, the locking members 170 can be solid. In some arrangements, a portion of the locking members 170 can be hollow. In such case, in some instances, the hollow portion of the locking members 170 can be filled with a fluid or other substance.

The housing 130 can include a plurality of sockets 135. The plurality of sockets 135 can be distributed about the housing 130 in any suitable manner. In one or more arrangements, the plurality of sockets 135 can be substantially equally spaced about the housing 130. The housing 130 can include an outer peripheral surface 136 and an inner peripheral surface 138.

The sockets 135 can extend substantially radially through the housing 130. The sockets 135 can sized, shaped, and/or configured to receive a respective one of the locking members 170. The sockets 135 can have a first end 237 and a second end 239. At the first end 237, the sockets 135 can open to the outer peripheral surface 136 of the housing 130. At the second end 239, the sockets 135 can open to the inner peripheral surface 138 of the housing 130. The sockets 135 can have a first diameter at the first end 237 and a second diameter at the second end 239. The first diameter can be smaller than the second diameter.

The first diameter can be sized to receive the second portion 170" (e.g., the second substantially semi-spherical portion 174) of the locking member 170. Thus, the second portion 170" or the second substantially semi-spherical portion 174 can moved in and out of a respective one of the sockets 135 at the first end 237. The first diameter can be smaller than the first portion 170' (e.g., the first substantially semi-spherical portion 172) of the locking member 170. Thus, the locking member 170 is prevented from moving out of the socket 135 through the first end 237.

The second diameter can be sized to receive the first portion 170' (e.g., the first substantially semi-spherical portion 172) of the locking member 170. The locking member 170 can be smaller than the second diameter such that the locking member 170 can pass through the second end 239 of the socket 135.

When the plunger 110 is a non-depressed position, such as is shown in FIGS. 3 and 5, the sockets 135 can be substantially aligned with the first diameter portion 112 of the plunger 110. As a result, the locking members 170 can be substantially prevented from retracting toward the longitudinal axis 111. A portion of each locking member 170 can extend into a respective one of the sockets 135 so as to extend beyond the outer peripheral surface 136 of the housing 130. In particular, the second portion 170" (e.g., the second substantially semi-spherical portion 174) can extend beyond the first end 237 of the socket 135. In this way, the second portion 170" (e.g., the second substantially semi-spherical portion 174) can retainably engage a retainer.

It should be noted that, when the plunger 110 is not depressed, the locking members 170 can engage the plunger 110. More particularly, the first portion 170' (e.g., the first substantially semi-spherical portion 172) can directly contact the first diameter portion of the plunger 110. As a result, the plunger 110 can physically prevent the locking members 170 from retracting radially inwardly.

When the plunger 110 is depressed, such as is shown in FIGS. 4 and 6, the sockets 135 can be substantially aligned with the second diameter portion 114 of the plunger 110. As a result, the locking members 170 can become spaced from the plunger 110, thereby giving the locking members 170 room to retract toward the longitudinal axis 111. The locking members 170 can retract so the point that they directly contact the second diameter portion 114 of the plunger 110.

The locking members 170 can retract toward the plunger 110. More particularly, the locking members 170 can retract such that they do not extend beyond the outer peripheral surface 136 of the lower housing 130. The first portion 170' (e.g., the first substantially semi-spherical portion 172) of the locking members 170 can become substantially flush with the outer peripheral surface 136 of the housing 130, or the first portion 170' (e.g., the first substantially semi-spherical portion 172) of the locking members 170 can be slightly recessed from the outer peripheral surface 136 of the housing 130. Thus, the locking members 170 can disengage the retainer. The retainer can be free to be separated from the retainer installation tool 100.

The second portion 170" (e.g., the second substantially semi-spherical portion 174) of the locking members 170 can extend beyond the second end 239 of the sockets 135. It will be appreciated that the locking members 170, the sockets 135, and/or the plunger 110 can be sized, shaped, and/or configured so that the locking members 170 do not completely retract from the sockets 135 for the operational range of motion of the plunger 110. The locking members 170, the sockets 135, and/or the plunger 110 can be sized, shaped, and/or configured so that, for the operational range of motion of the plunger 110, the sockets 135 are aligned with either the first diameter portion 112 or the second diameter portion 114 of the plunger 110.

A portion of each locking member 170 can extend into a respective one of the sockets 135 so as to extend beyond the outer peripheral surface 136 of the housing 130. In particular, the second portion 170" (e.g., the second substantially semi-spherical portion 174) can extend beyond the first end 237 of the socket 135. In this way, the second portion 170" (e.g., the second substantially semi-spherical portion 174) can retainably engage a retainer.

Figure 11:
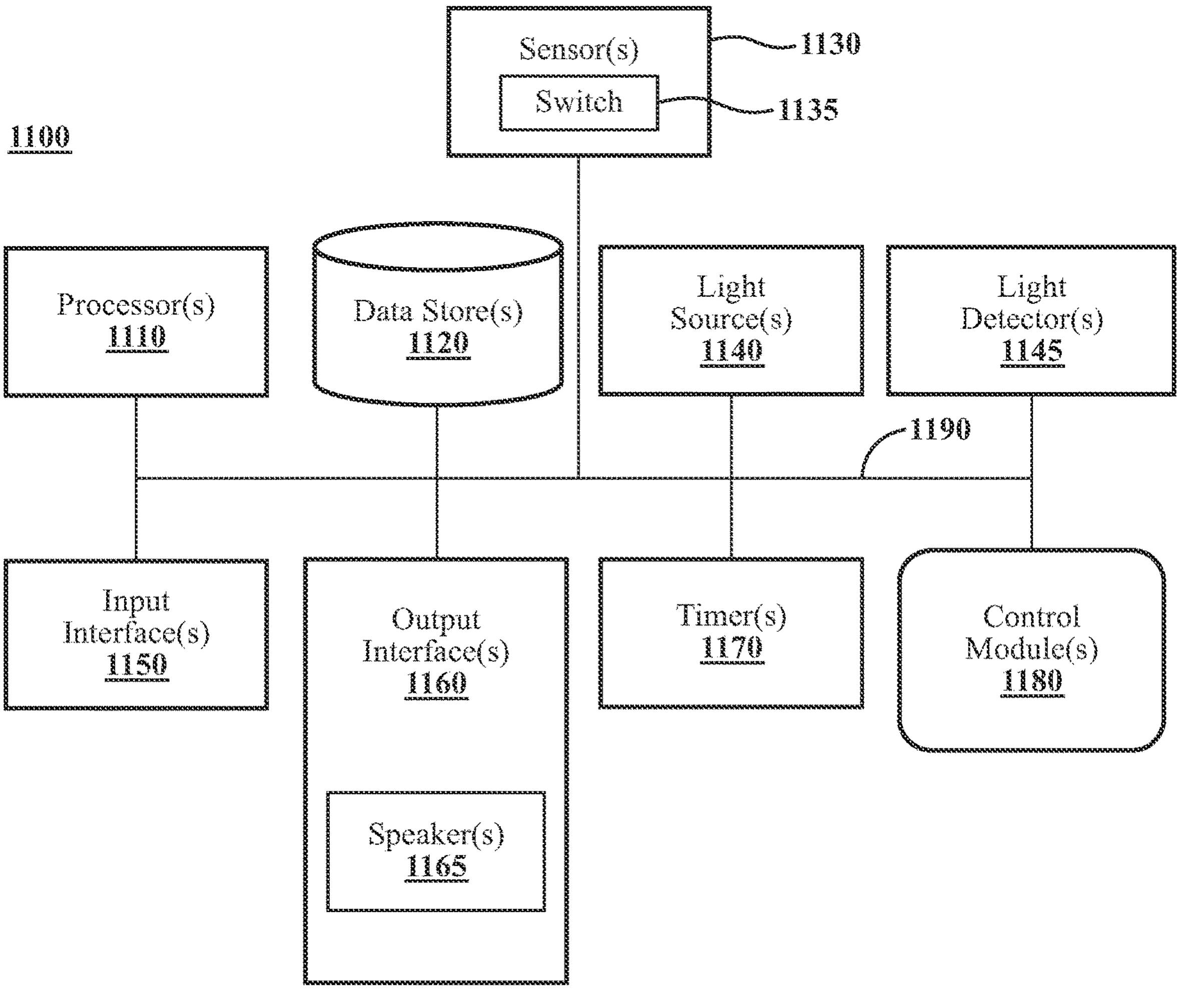
FIG. 11 is an example of a system for the retainer installation tool.

The retainer installation tool 100 can include a system 1100. The system 1100 can have various elements. Some of the possible elements of the system 1100 are shown in FIG. 11 and will now be described. It will be understood that it is not necessary for the system 1100 to have all of the elements shown in FIG. 11 or described herein. The system 1100 can have any combination of the various elements shown in FIG. 11. Further, the system 1100 can have additional elements to those shown in FIG. 11. In some arrangements, the system 1100 may not include one or more of the elements shown in FIG. 11. Further, the elements shown may be physically separated by large distances. Indeed, one or more of the elements can be located remote from retainer installation tool 100. Some of the elements can be components of the retainer installation tool 100 while some of the elements may not be components of the retainer installation tool 100.

The system 1100 can include one or more processors 1110, one or more data stores 1120, one or more sensors 1130, one or more light sources 1140, one or more light detectors 1145, one or more input interfaces 1150, one or more output interfaces 1160, one or more timers 1170, and one or more control modules 1180. Each of these elements will be described in turn below.

The various elements of the system 1100 can be communicatively linked through one or more communication networks 1190. As used herein, the term "communicatively linked" can include direct or indirect connections through a communication channel or pathway or another component or system. A "communication network" means one or more components designed to transmit and/or receive information from one source to another. The communication network(s) 1190 can be implemented as, or include, without limitation, a wide area network (WAN), a local area network (LAN), the Public Switched Telephone Network (PSTN), a wireless network, a mobile network, a Virtual Private Network (VPN), the Internet, and/or one or more intranets. The communication network(s) 1190 further can be implemented as or include one or more wireless networks, whether short or long range. For example, in terms of short-range wireless networks, the communication network(s) 1190 can include a local wireless network built using a Bluetooth or one of the IEEE 802 wireless communication protocols, e.g., 802.11a/b/g/i, 802.15, 802.16, 802.20, Wi-Fi Protected Access (WPA), or WPA2. In terms of long-range wireless networks, the communication network(s) 1190 can include a mobile, cellular, and or satellite-based wireless network and support voice, video, text, and/or any combination thereof. Examples of long-range wireless networks can include GSM, TDMA, CDMA, WCDMA networks or the like. The communication network(s) 1190 can include wired communication links and/or wireless communication links. The communication network(s) 1190 can include any combination of the above networks and/or other types of networks. The communication network(s) 1190 can include one or more routers, switches, access points, wireless access points, and/or the like.

One or more elements of the system 1100 include and/or can execute suitable communication software, which enables two or more of the elements to communicate with each other through the communication network(s) 1190 and perform the functions disclosed herein.

As noted above, the system 1100 can include one or more processors 1110. "Processor" means any component or group of components that are configured to execute any of the processes described herein or any form of instructions to carry out such processes or cause such processes to be performed. The processor(s) 1110 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor(s) 1110 can include at least one hardware circuit (e.g., an integrated circuit) configured to carry out instructions contained in program code. In arrangements in which there is a plurality of processors 1110, such processors can work independently from each other, or one or more processors can work in combination with each other.

The system 1100 can include one or more data stores 1120 for storing one or more types of data. The data store(s) 1120 can include volatile and/or non-volatile memory. Examples of suitable data stores 1120 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 1120 can be a component of the processor(s) 1110, or the data store(s) 1120 can be operatively connected to the processor(s) 1110 for use thereby. The term "operatively connected," as used throughout this description, can include direct or indirect connections, including connections without direct physical contact.

The system 1100 can include one or more sensors 1130. "Sensor" means any device, component and/or system that can detect, determine, assess, monitor, measure, quantify and/or sense something. The sensor(s) 1130 can detect, determine, assess, monitor, measure, quantify and/or sense in real-time. As used herein, the term "real-time" means a level of processing responsiveness that a user, entity, component, and/or system senses as sufficiently immediate for a particular process or determination to be made, or that enables a processor to process data at substantially the same rate as some external process or faster.

In arrangements in which there are a plurality of sensors 1130, the sensors 1130 can work independently from each other. Alternatively, two or more of the sensors 1130 can work in combination with each other. In such case, the two or more sensors 1130 can form a sensor network. The sensor(s) 1130 can be operatively connected to the processor(s) 1110, the data store(s) 1120, and/or other element of the system 1100 (including any of the elements shown in FIG. 11).

The sensor(s) 1130 can include any suitable type of sensor. For instance, the sensor(s) 1130 can include one or more sensors configured to detect, measure, or acquire data about when the retainer installation tool 100 is engaging a work piece. For instance, the sensor(s) 1130 can detect the location of the retainer installation tool 100 relative to a work piece (e.g., a vehicle bumper). Ins some arrangements, the sensor(s) 1130 can be configured to detect when the retainer installation tool 100 is contacting a work piece. The sensor(s) 1130 can include proximity sensors, pressure sensors, positional sensors, a combination thereof, or the like.

In some arrangements, the sensor(s) 1130 can include a switch 1135. The switch 1135 can be any suitable type of switch, now known or later developed. For example, the switch 1135 can be a snap-acting switch.

In some arrangements, when the retainer installation tool 100 is sufficiently compressed and/or a sufficient amount of downward pressure or force is applied on the retainer installation tool 100, the switch 1135 can be physically engaged by one or more structures of the retainer installation tool 100 and/or the workpiece. In one or more arrangements, the switch 1135 can be located on the platform 140. The switch 1135 can be activated when the outer casing 102 contacts the switch 1135. The engagement of the switch 1135 can cause one or more timers to be activated, as will be explained herein.

The system 1100 can include one or more light sources 1140. The light source(s) 1140 can be operatively positioned to emit light toward a work area of the retainer installation tool 100. The light source(s) 1140 can be configured to emit any suitable type of light. For example, in one or more arrangements, the light source(s) 1140 can emit ultraviolet light. In other arrangements, the light source(s) 1140 can be configured to emit polychromatic, visible light, infrared light, or light from any region of the electromagnetic spectrum.

The system 1100 can include one or more light detectors 1145. The light detector(s) 1145 can be operatively positioned to detect one or more properties of the light after the light has interacted a work area. For example, the light detector(s) 1145 can be configured to detect one or more light signatures after the light has interacted with the work area. More particularly, the light detector(s) 1145 can be configured to detect one or more light signatures after the light has interacted with an adhesive on the work area. The light detector(s) 1145 can be any suitable type of light detector(s). For example, the light detector(s) 1145 can be spectrometer(s) or detector(s) having multiple spectral filters.

The light detector(s) 1145 can be operatively positioned to detect a light signature from the work area. In one or more arrangements, an adhesive (e.g., retainer primer glue) and/or adhesion promoter can include a substance, material, or particles to make it reflective. For instance, the adhesive and/or adhesion promoter can include an ultraviolet reflective substance, material, or particles. Thus, when an ultraviolet light is shined on it, the adhesive will reflect. The light detector(s) 1145 can be located in the side enclosure portion 139 of the retainer installation tool 100. The light detector(s) 1145 can scan for a light signature (e.g., ultraviolet reflectivity) of the adhesive and/or adhesive promoter.

The system 1100 can include one or more input interfaces 1150. An "input interface" includes any device, component, system, element or arrangement or groups thereof that enable information/data to be entered into a machine. The input interface(s) 1150 can receive an input from a user (e.g., a person) or other entity. Any suitable input interface(s) 1150 can be used, including, for example, a keypad, display, touch screen, multi-touch screen, button, joystick, mouse, trackball, microphone, gesture recognition, and/or combinations thereof.

The system 1100 can include one or more output interfaces 1160. An "output interface" includes any device, component, system, element or arrangement or groups thereof that enable information/data to be presented to a user (e.g., a person) or other entity. The output interface(s) 1160 can present information/data to a user or other entity. The output interface(s) 1160 can include a display, an earphone, a haptic device, a projector, and/or speaker 1165. Examples of speakers include, for example, electroacoustic transducers, sound chips, and sound cards. Some components of the system 1100 may serve as both a component of the input interface(s) 1150 and a component of the output interface(s) 1160.

The system 1100 can include one or more timers 1170. The timer(s) 1170 can be any suitable timer, now known or later developed. The timer(s) 1170 can be configured to count up or down from an event or starting point. For example, the event can be when the switch 1135 is activated. In such case, a signal can be sent to activate the timer(s) 1170.

The system 1100 can include one or more modules, at least some of which will be described herein. The modules can be implemented as computer readable program code that, when executed by a processor, implement one or more of the various processes described herein. One or more of the modules can be a component of the processor(s) 1110, or one or more of the modules can be executed on and/or distributed among other processing systems to which the processor(s) 1110 is operatively connected. The modules can include instructions (e.g., program logic) executable by one or more processor(s) 1110. Alternatively or additionally, the data store(s) 1120 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The system 1100 can include one or more control modules 1180. The control module(s) 1180 can be configured to perform various functions with respect to the retainer installation tool 100.

For instance, the control module(s) 1180 can be configured to receive input signals from the light detector(s) 1145. If the input signal indicates that a light signature is present, the control module(s) 1180 can be configured to take no action or otherwise enable the retainer installation tool 100 to operate. Alternatively or additionally, the control module(s) 1180 can cause an indicator to be presented to an operator that it is ok to proceed with use of the retainer installation tool 100. For instance, the control module(s) 1180 can be configured to cause the output interface(s) 1160 to present a visual, audial, and/or haptic alert to a user.

If the input signal indicates that a light signature is not present, the control module(s) 1180 can be configured to disable the retainer installation tool 100. As a result, a user will not be able to operate the retainer installation tool 100. Alternatively or additionally, the control module(s) 1180 can cause an indicator to be presented to an operator that it is not ok to proceed with use of the retainer installation tool 100. For instance, the control module(s) 1180 can be configured to cause the output interface(s) 1160 to present a visual, audial, and/or haptic alert to a user.

Alternatively, the control module(s) 1180 can be configured to analyze data received from the light detector(s) 1145. Depending on whether the control module(s) 1180 detects or does not detect a light signature in the data, then the control module(s) 1180 can proceed as described above. In some arrangements, the control module(s) 1180 can use light signature data store in the data store(s) 1120 to compare to the received data from the light detector(s) 1145.

For instance, the control module(s) 1180 can be configured to receive input signals from the timer(s) 1170 and/or the sensor(s) 1130. If the input signal indicates that the retainer installation tool 100 has been in contact with a work piece for a sufficient period of time, the control module(s) 1180 can cause an indicator to be presented to an operator that it is ok to proceed with separating a retainer from the retainer installation tool 100. For instance, the control module(s) 1180 can be configured to cause the output interface(s) 1160 to present a visual, audial, and/or haptic alert to a user.

Figure 12:
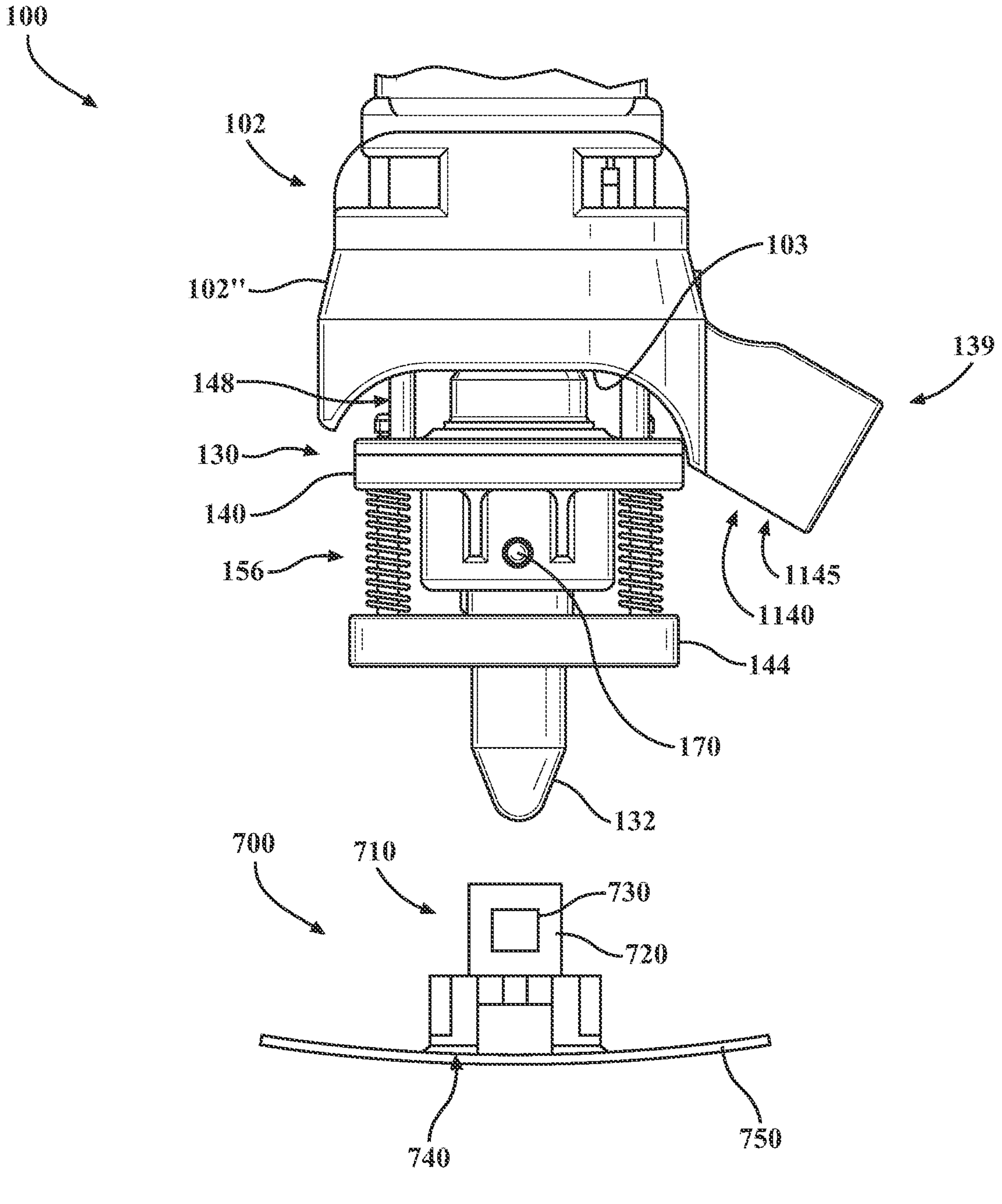
FIG. 12 is an example of the retainer installation tool and a retainer.
Figure 13:
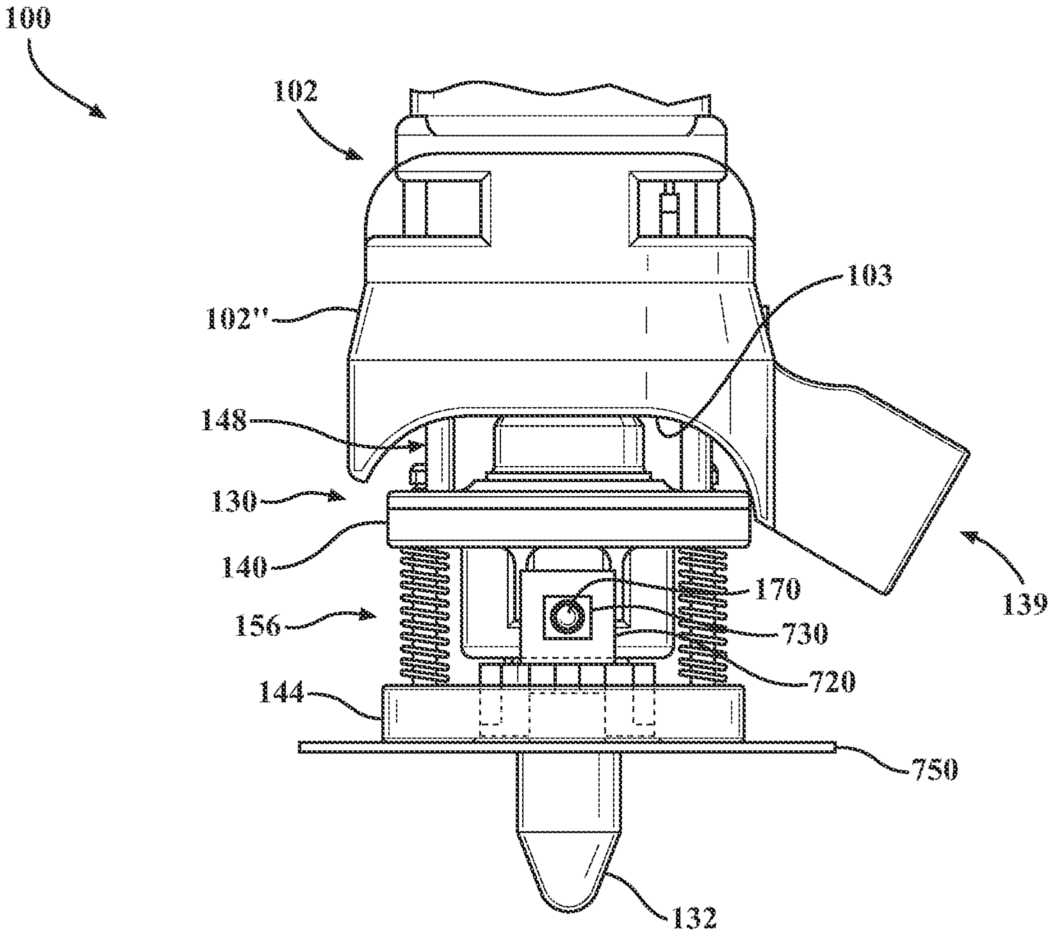
FIG. 13 is an example of the retainer installation tool retainably engaging the retainer.

A non-limiting example of the operation of the arrangements described herein will now be presented in connection to FIGS. 12-13. Referring to FIG. 12, the retainer installation tool 100 and a retainer 700 are shown. To facilitate the discussion, only a lower portion of the retainer installation tool 100 is shown. The retainer 700 can have any suitable size, shape, and/or configuration. In this example, the retainer 700 can be for use with a sonar senor for a vehicle. The retainer 700 can include a sensor holder portion 710. The sensor holder portion 710 can include one or more flanges 720. Only one flange 720 is visible in FIG. 12. However, in some arrangements, there can be a second flange in line with the flange 720. The flange 720 can include an aperture 730. The aperture 730 can have any size, shape, and/or configuration. In one or more arrangements, the aperture 730 can be substantially rectangular.

In some instances, an adhesive can be provided on a workpiece interfacing-side 740 of the retainer 700. In some instances, the retainer 700 can include a backing 750 to protect the adhesive. When ready for use, the backing 750 can be removed to expose the adhesive.

The retainer installation tool 100 and/or the retainer 700 can be brought into contact with each other. For example, a person can manually bring the retainer installation tool 100 into contact with the retainer 700. The locating nose 132 of the retainer installation tool 100 can be received in an aperture in the sensor holder portion 710 of the retainer. The locking member 170 of the retainer installation tool 100 can be received in the aperture 730. As a result, the retainer 700 can be retainably engaged by the retainer installation tool 100. A user can now move around with the retainer installation tool 100 without concern of the retainer 700 becoming separated from the retainer installation tool 100.

The retainer installation tool 100 can be used to install the retainer 700 on a workpiece. In one or more arrangements, the work piece can be a vehicle bumper or other vehicle body member. The workpiece can include an aperture for receiving the retainer 700. An adhesive or adhesion promoter can be placed on the work piece in and/or around the aperture. The adhesive or adhesion promoter can include one or more agents, substances, particles, etc. that, when impinged upon by light, cause a light signature to be presented. The adhesive or adhesion promoter can help the adhesive on the retainer to adhere to the workpiece and/or it can help to secure the retainer to the workpiece.

The retainer installation tool 100 can be brought near the workpiece. The light source(s) 1140 can be activated, such as by user input provided on the input interface(s) 1150. The light emitted by the light source(s) 1140 can be directed toward the aperture. The light detector(s) 1145 can acquire data about when the light emitted by the light source(s) 1140 engages the workpiece and, more particularly, the adhesive. If the light signature is detected by the light detector(s) 1145 and/or the control module(s) 1180, the control module(s) 1180 can cause an indicator to be presented to the user, indicating that an adhesive is present. For instance, the control module(s) 1180 can cause the output interface(s) 1160 to emit a visual, audial, and/or haptic indicator to the user. If the light signature is not detected by the light detector(s) 1145 and/or the control module(s) 1180, the control module(s) 1180 can cause the retainer installation tool 100 to be deactivated or otherwise prevented from operating. In some instances, the control module(s) 1180 can cause an indicator to be presented to the user, indicating that adhesive is not present on the workpiece.

If the retainer installation tool 100 indicates that an adhesive or adhesion promoter is present, then retainer installation tool 100 can be manipulated to insert the retainer 700 in the aperture in the workpiece. The paper or plastic backing can be removed from the retainer. The user can insert the locating nose 132 into the aperture. Once inserted, the user can press the retainer installation tool toward the workpiece.

Eventually, the retainer 700 can come into contact with the workpiece. The push ring 144 can be designed to push all around the retainer 700 to ensure good surface area pressure on the non-adhesive side of the retainer 700 and then this force is transferred to the workpiece as pressure over time is applied downward on the adhesive side and surface prepared workpiece receiving the retainer 700. The central aperture of the retainer 700 can be aligned with the aperture in the workpiece. In some instances, a portion of the retainer 700 can be received in the aperture of the workpiece. The aperture in the workpiece can allow a wire harness to be operatively connected to a sensor or other component held by the retainer 700.

It will be appreciated that, as the user presses down, a portion of the retainer installation tool 100 can be compressed. For instance, the platform 140 and the push ring 144 can move toward each other due to the second plurality of fasteners 156 being able to move within apertures 141 provided in the platform 140. Likewise, the outer casing 102 and the platform 140 can move toward each other, as the first plurality of fasteners 148 can move within the apertures 137 provided in the outer casing 102.

When fully pressed down, the push ring 144 can hold press the retainer 700 against the workpiece. The push ring 144 can provide a continuous contact surface between the retainer 700 and the workpiece. It will be appreciated that the part engaging surface(s) 103 can substantially matingly engage the workpiece.

The sensor(s) 1130 can detect when a portion of the retainer installation tool 100 is in contact with the work piece. For example, the switch 1135 can be activated when the outer casing 102 contacts the switch 1135. When detected, the timer(s) 1170 can begin counting. The timer(s) 1170 can continue counting while the retainer installation tool 100 is in contact with the workpiece. The timer(s) 1170 can count toward a predetermined amount of time. The predetermined amount of time can correspond to a time sufficient for the adhesive to cure or set to ensure that the retainer 700 will be sufficiently held on the workpiece.

When the predetermined amount of time has elapsed, the control module(s) 1180 can cause an indicator to be presented to the user, indicating that the user can release the retainer 700 from the retainer installation tool 100. As an example, the control module(s) 1180 can cause an audial indicator to be presented, such as by one or more speakers 1165 of the output interface(s) 1160.

When the audial indicator is provided, the user can separate the retainer installation tool 100 from the retainer 700. For instance, the user can engage the release member 180. For instance, a user can push down on the release member 180 with a palm of his or her hand. In doing so, the plunger 110 can be depressed downwardly. The second diameter portion 114 of the plunger 110 can become substantially aligned with the sockets 135. As a result, the locking members 170 can be allowed to move inwardly toward the plunger 110. The locking members 170 can retract such that the locking members 170 do not extend beyond the outer peripheral surface 136 of the housing 130. Ultimately, the locking members 170 can disengage the retainer 700. Thus, the retainer 700 is free to be separated from the retainer installation tool 100.

At this point, the user can pull the retainer installation tool 100 away from the workpiece. Since the retainer 700 is disengaged from the locking member 170, the retainer installation tool 100 can separate from the retainer 700. The retainer 700 can remain in place on the workpiece due to the adhesive.

As the retainer installation tool 100 moves away from the workpiece, the plunger 110 can be biased into a non-depressed position for subsequent use, such as due to the bias of the spring member(s) 190.

It will be appreciated that arrangements described herein can provide numerous benefits, including one or more of the benefits mentioned herein. For example, arrangements described herein can result in manufacturing improvements. Arrangements described herein can facilitate proper retainer installation. Arrangements described herein can reduce manufacturing installation errors. Arrangements described herein can be adaptable in that a standard body can be used with different application heads to install retainers into bumpers. From a customer standpoint, arrangements described herein can facilitate the improved quality and accuracy of sonars used in vehicle safety. Arrangements described herein can lead to cost and/or weight savings over current installation tools and methods. Arrangements described herein can ensure that an adhesive or adhesion promoter are properly applied on a workpiece before installing a retainer on the workpiece. Various components of the retainer installation tool can be formed by three-dimensional printing, machined, compression molded, blow molded, vacuum formed, injection molded, or cast all out of various plastics, metals, or other materials. Arrangements described herein can avoid issues experienced with current installation tools. For instance, the retainer installation tool described herein can hold a retainer in place during the installation process. As a result, the retainer installation tool does not have to be picked up and set back down on the retainers during installation. Arrangements described herein can result in a tool that requires significantly less push force to release a retainer compared to existing installation tools. Arrangements described herein can improve ergonomics for a user of the tool.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "or" is intended to mean an inclusive "or" rather than an exclusive "or." The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC, or ABC). As used herein, the term "substantially" or "about" includes exactly the term it modifies and slight variations therefrom. Thus, the term "substantially parallel" means exactly parallel and slight variations therefrom. "Slight variations therefrom" can include within 15 degrees/percent/units or less, within 14 degrees/percent/units or less, within 13 degrees/percent/units or less, within 12 degrees/percent/units or less, within 11 degrees/percent/units or less, within 10 degrees/percent/units or less, within 9 degrees/percent/units or less, within 8 degrees/percent/units or less, within 7 degrees/percent/units or less, within 6 degrees/percent/units or less, within 5 degrees/percent/units or less, within 4 degrees/percent/units or less, within 3 degrees/percent/units or less, within 2 degrees/percent/units or less, or within 1 degree/percent/unit or less. In some instances, "substantially" can include being within normal manufacturing tolerances.

Aspects herein can be embodied in other forms without departing from the spirit or essential attributes thereof. Accordingly, reference should be made to the following claims, rather than to the foregoing specification, as indicating the scope hereof.

What is claimed is:

1. A tool, comprising:

a housing including apertures and an outer peripheral surface;

a plunger extending partially within the housing and being movable along a longitudinal axis within the housing;

locking members having a first and second substantially semi-spherical portion, the first substantially semi-spherical portion having a diameter larger than the second substantially semi-spherical portion and the apertures, a diameter of the second substantially semi-spherical portion being smaller than the apertures; and the tool being configured so that:

when the plunger is in a non-depressed position, a portion of the second substantially semi-spherical portions extend beyond the outer peripheral surface, whereby the locking members retainably engage a retainer on the tool, when the plunger is in a depressed position, the second substantially semi-spherical portions retract such that the locking members extend within the outer peripheral surface to disengage the retainer, whereby the retainer is free to be separated from the tool.

2. The tool of claim 1, wherein the plunger has a first diameter portion and a second diameter portion, wherein the first diameter portion is larger than the second diameter portion, wherein, when the plunger is depressed, the second diameter portion is aligned with the apertures such that the locking members retract toward the plunger.

3. The tool of claim 2, wherein, when the plunger is non-depressed, the first diameter portion is aligned with the apertures such that the locking members are substantially prevented from retracting toward the plunger.

4. The tool of claim 1, wherein the plunger is biased into a non-depressed position by one or more spring members.

5. The tool of claim 1, further including a locating nose operatively connected to the housing, whereby the locating nose is usable to center the tool on an aperture in a workpiece.

6. The tool of claim 1, further including a release member, the release member being positioned to cause the plunger to be depressed along the longitudinal axis.

7. The tool of claim 1, further including:

a light source, wherein the light source is configured to emit light, and wherein the light source is positioned to emit light toward a work area; and a light detector, wherein the light detector is configured to detect a light signature in the work area when exposed to light from the light source.

8. The tool of claim 7, further including a processor, wherein the processor is configured to cause an alert to be presented when a light signature is not detected in the work area when exposed to light from the light source.

9. The tool of claim 1, further including:

a sensor;

a timer; and one or more processors operatively connected to the sensor and the timer, wherein the one or more processors are configured to:

start the timer when the sensor is activated; and cause an alert to be presented when a predetermined amount of time has elapsed according to the timer.

10. The tool of claim 1, further including an outer casing, and wherein the outer casing includes a part engaging surface.

11. The tool of claim 10, further including:

a push ring, wherein the push ring is configured to engage a retainer; and a platform located between the outer casing and the push ring.

12. The tool of claim 11, wherein the push ring and the platform are configured to move relative to each other, and wherein the platform and the outer casing are configured to move relative to each other.

13. A tool, comprising:

a housing including apertures and an outer peripheral surface;

a plunger extending partially within the housing and being movable therein;

locking members having a double substantially semi-spherical shape including a first and second substantially semi-spherical portion, the first substantially semi-spherical portion being larger than the second substantially semi-spherical portion and the apertures, the second substantially semi-spherical portion being smaller than the apertures;

a push ring including a central aperture;

a locating nose operatively connected to the housing and received in the central aperture, the plunger being movable relative to the locating nose; and when the plunger is in a first position, a portion of each locking member extends into a respective one of the apertures so as to extend beyond the outer peripheral surface, whereby the locking members retainably engage a retainer on the tool, when the plunger is in a second position, the locking members retract toward the plunger such that the locking members do not extend beyond the outer peripheral surface, whereby the locking members disengage the retainer such that the retainer is free to be separated from the tool.

14. The tool of claim 13, wherein the plunger has a longitudinal axis, wherein the plunger is moved along the longitudinal axis in going from the first position to the second position.

15. The tool of claim 14, wherein the plunger has a first diameter portion and a second diameter portion, wherein the first diameter portion is larger than the second diameter portion, wherein, when the plunger is in the second position, the second diameter portion is aligned with the apertures such that the locking members retract inwardly toward the plunger, and wherein, when the plunger is in the first position, the first diameter portion is aligned with the apertures such that the locking members are substantially prevented from retracting toward the plunger.

* * * * *